Figure 2:
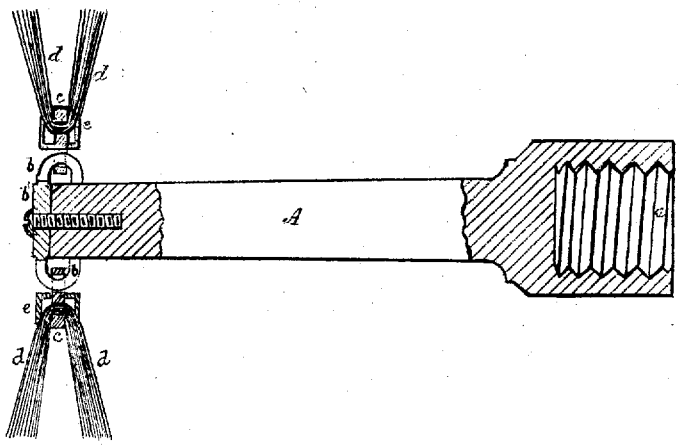

R. DIMES.

Processes and Apparatus for Stippling Metallic Surfaces.

No. 5,378. Reissued April 29, 1873.

Witnesses:

Geo. F. Smith

James H. Hunter

Inventor:

Richard Dimes

AM. PHOTO-LITHOGRAPHIC CO. N.Y. (OSBORNE'S PROCESS.)

UNITED STATES PATENT OFFICE.

RICHARD DIMES, OF NEW YORK, N. Y., ASSIGNOR TO TIFFANY & CO., OF SAME PLACE.

IMPROVEMENT IN PROCESSES AND APPARATUS FOR STIPPLING METALLIC SURFACES.

Specification forming part of Letters Patent No. 128,290, dated June 25, 1872; reissue No. 5,378, dated April 29, 1873; application filed April 2, 1873.

*To all whom it may concern:*

Be it known that I, RICHARD DIMES, of the city, county, and State of New York, have invented certain new and useful Improvements in Stippling and Dressing the Surfaces of Metals; and I do hereby declare that the following is a full, clear, and exact description of the same.

This invention relates to stippling and dressing surfaces of silver-ware and other goods composed of metal, or containing metallic surfaces, by means of stippling-points, made of metal or other suitable material, so manipulated that they will impinge against and rebound from the metallic surface with which they are brought in contact. This operation will leave the surface so stippled in a finely-indented condition giving to the naked eye a satin or pearl finished appearance; also, relates to the stippled or satin-finish surface of the metal itself, called "stippling" or "satin-finish," as a new manufacture.

In the drawing is shown one way in which these stippling-points may be so manipulated.

Figure 1:
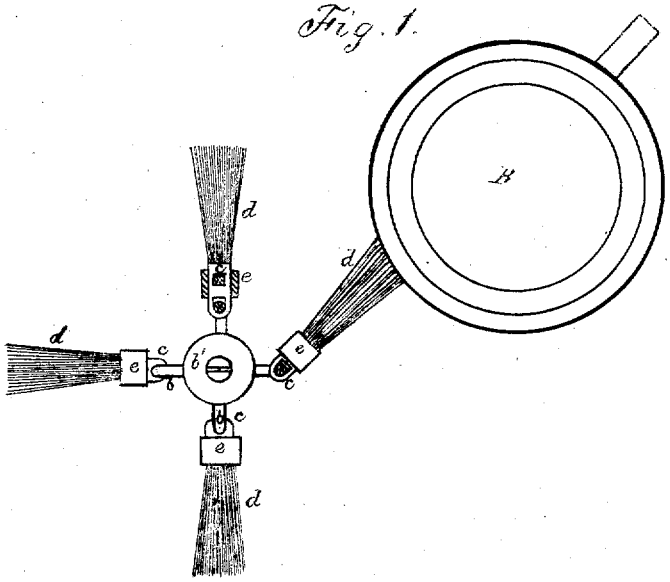

Figure 1 is a front view of a stippling device, and Fig. 2 is a side sectional view of the same.

A is a spindle or chuck, provided at one end with a screw-nut, *a*, by which it may be screwed upon the mandrel of a lathe. The opposite end of the chuck is provided with a suitable number of loops, *b*, which receive links *c*, each of which has two perforations, through one of which passes a loop, *b*, said loops *b* being attached to a chuck-head, *b'*. Through the other perforation the stippling-points *d* pass, and in which they are secured by the sliding cap *e*, as shown.

The stippling-points are composed of metal, preferably of elastic wire. Each link is intended to carry a number of the stippling-points, which may be of greater or less size, according to the nature of the stippling action that may be required.

When the chuck A is made to revolve with sufficient rapidity the bunches of jointed stippling-points, as here arranged, will swing or stand out radially straight from the chuck; and if a goblet, B, or other article to be stippled satin or pearl finished, be held in such a position that the flying stippling-points will strike it, the said points will produce indentations in the surface of the article, and the elasticity of the stippling-points, together with the joints of their links, will enable them to bend sufficiently to pass the goblet or other article after the points have struck it, as shown in the drawing. The surface of the article thus presented to the action of the stippling-points will in this manner be quickly covered with minute indentations, whereby a stippled satin or pearl finished appearance of great beauty is obtained at a small cost.

If it is desired to keep portions of the surface of the article smooth to form a design, a shield of metal or other material is placed over the part that is to be kept smooth during the operation of the stippling device.

Various forms or kinds of stippling may be produced by increasing or diminishing the number or sizes of the stippling-points.

*Claims.*

1. The process of stippling satin or pearl finishing, substantially as described.
2. One or more bunches of stippling-points loosely connected to a revolving chuck or mandrel, substantially as described.
3. The combination of one or more bunches of stippling-points with links loosely connecting said bunches to loops on the chuck or mandrel, substantially as described.
4. A metallic surface stippled or satin-finished, substantially as described.
5. The combination of the link *c*, cap *e*, and stippling-points *d*, substantially as described.
6. The chuck-head *b'*, carrying the loops *b*, substantially as described.

RICHARD DIMES.

Witnesses:

SAM. TRO. SMITH,
JAMES H. HUNTER.